United States Patent [19]

Hofmann

[11] Patent Number: 4,534,275
[45] Date of Patent: Aug. 13, 1985

[54] AIR DISCHARGE INSTALLATION FOR THE AIR FEED INTO THE INTERIOR SPACE OF A VEHICLE

[75] Inventor: Peter Hofmann, Weissach, Fed. Rep. of Germany

[73] Assignee: Dr. Ing. h.c.F. Porsche AG, Fed. Rep. of Germany

[21] Appl. No.: 556,121

[22] Filed: Nov. 29, 1983

[30] Foreign Application Priority Data

Dec. 3, 1982 [DE] Fed. Rep. of Germany ....... 3244729

[51] Int. Cl.³ ............................................... B60H 1/24
[52] U.S. Cl. ........................................ 98/2; 98/41.1; 251/212; 251/228; 251/251
[58] Field of Search ................... 98/2, 41 R; 251/212, 251/228, 251

[56] References Cited

U.S. PATENT DOCUMENTS 2,539,293 1/1951 Balzer ............................ 98/41 R X
4,249,460 2/1981 McSwain ....................... 98/41 R X

FOREIGN PATENT DOCUMENTS 504836 8/1951 Belgium ............................. 251/228
290810 3/1963 Netherlands ....................... 98/41 R
752198 7/1956 United Kingdom .

Primary Examiner—Harold Joyce
Attorney, Agent, or Firm—Craig & Burns

[57] ABSTRACT

An air discharge installation for supplying air into the interior space of a vehicle, in which an air regulating element connected with an actuating device is arranged in a housing within the area of an air inlet opening. To provide an installation which requires a small structural space combined with good and reliable functioning and which further enables a metered control of the air space, the air regulating element includes at least two valve sections pivotally connected with each other which are adapted to be moved from a folded-together, open position in which the two valve sections are disposed one above the other, into an unfolded closing position by way of intermediate positions. The first valve section is rotatably supported at the housing with its end remote from the actuating device while the second valve section is connected with the free end of the first valve section by way of a pivot bearing; additionally, a lever with a pin is arranged at the second valve section which extends at a distance to the pivot bearing and cooperates with a guide track in the housing, whereby the actuating device engages at the first valve section.

18 Claims, 5 Drawing Figures

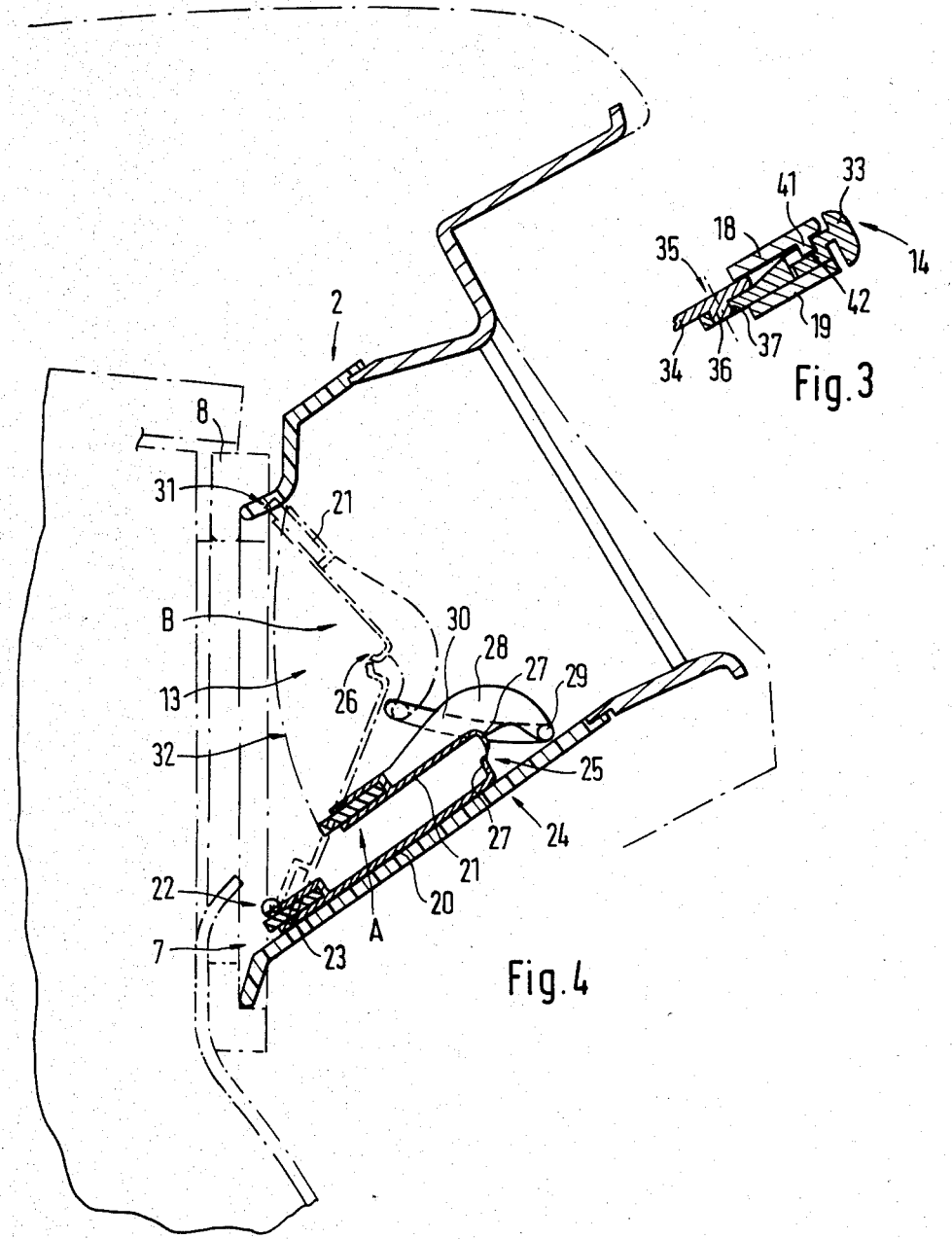
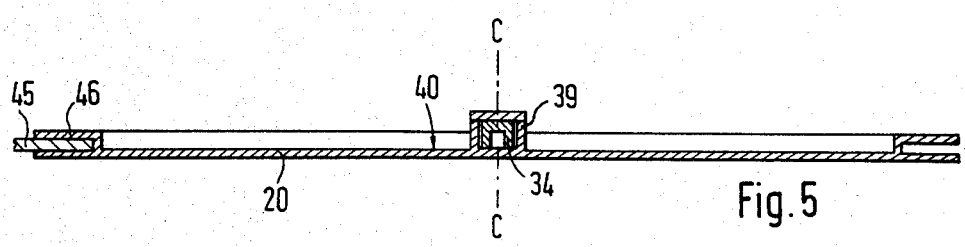

AIR DISCHARGE INSTALLATION FOR THE AIR FEED INTO THE INTERIOR SPACE OF A VEHICLE

The present invention relates to an air discharge installation for controlling the air supply into the interior space of a vehicle, in which an air regulating element connected with an actuating device is arranged in a housing within the area of an air inlet opening.

A prior art air discharge installation of the aforementioned type (German Auslegeschrift No. 16 55 956) is connected with a heater housing disposed therebehind by means of an elastic sealing body. For regulating the air supply, an air-regulating element constructed in one piece is provided within the area of the air inlet opening, which is rotatably supported in the lower edge area of the housing. This prior art arrangement entails the disadvantage that the sealing body arranged between the heater housing and the air discharge installation is locally so strongly deformed as a result of the occurring installation tolerances that it projects into the pivot area of the air regulating element and blocks the same in a certain position. A further adjusting movement of the air regulating element is thereupon no longer possible without costly repair measures. Additionally, the air regulating element projects in its open position relatively far beyond the air inlet opening of the housing so that this type of pivotal connection is not suitable with constricted space conditions.

It is additionally disadvantageous that a metered control of the air flow is no longer assured beginning with a certain intermediate position of the air regulating element.

In another prior art air discharge installation (German Auslegeschrift No. 27 01 816), the air regulating element which is constructed in one piece, is arranged inside of the housing and is pivotally supported about a pivot axis provided approximately centrally at the air regulating element. Since the axis of rotation is arranged with a corresponding distance to the rear (upstream) edge of the housing, a pivoting of the air regulating element into the sealing body is avoided; however, a large structural space especially in the longitudinal direction of the duct or channel is required for this construction.

It is the aim of the present invention to provide an air discharge installation which, combined with good and reliable functioning, requires a small structural space and which enables a metered control of the air flow.

The underlying problems are solved according to the present invention in that the air regulating element includes at least two valve or flap sections pivotally connected with each other, which are movable from a folded-together open position in which the two sections are disposed one above the other, into an unfolded, closing position by way of intermediate positions, whereby the first valve section is rotatably supported at the housing with its end remote from the actuating device and the second valve section is connected with the free end of the first valve section by way of a pivot bearing, in that the second valve section includes a lever with a pin which extends at a distance to the pivot bearing and cooperates with a guide track in the housing, and in that additionally the actuating device engages at the first valve section.

The advantages principally achieved with the present invention reside in that only very little structural space is required in the longitudinal direction by the two-piece, foldable construction of the air regulating element. Since the two valve sections are disposed in all positions thereof inside of the air discharge installation and do not come into contact with the sealing body, a completely satisfactory functioning of the air regulating element is assured at all times. Additionally, it is avoided by this arrangement that operating difficulties of the air-regulating element occur by reason of assembly tolerances. The self-locking linkage which cooperates with the female mounting part of the first valve section, in which the linkage is received, assures that the air-regulating element remains in a once-adjusted position. An air-regulating element which is simple in construction and favorable as regards costs is created by the one-piece construction of the two valve sections and of the film-joint hinge. The construction of the guide track and of the pin as well as the arrangement thereof with respect to the pivot bearing in conjunction with the linkage and the female mounting part bring about a positively controlled movement of the air-regulating element.

These and other objects, features and advantages of the present invention will become more apparent from the following description when taken in connection with the accompanying drawing which shows, for purposes of illustration only, one embodiment in accordance with the present invention, and wherein:

FIG. 3 is a partial cross-sectional view taken along line III—III of FIG. 1;

FIG. 4 is a cross-sectional view, taken along line IV—IV of FIG. 2; and

FIG. 5 is a cross-sectional view taken along line V—V of FIG. 1.

Figure 1:
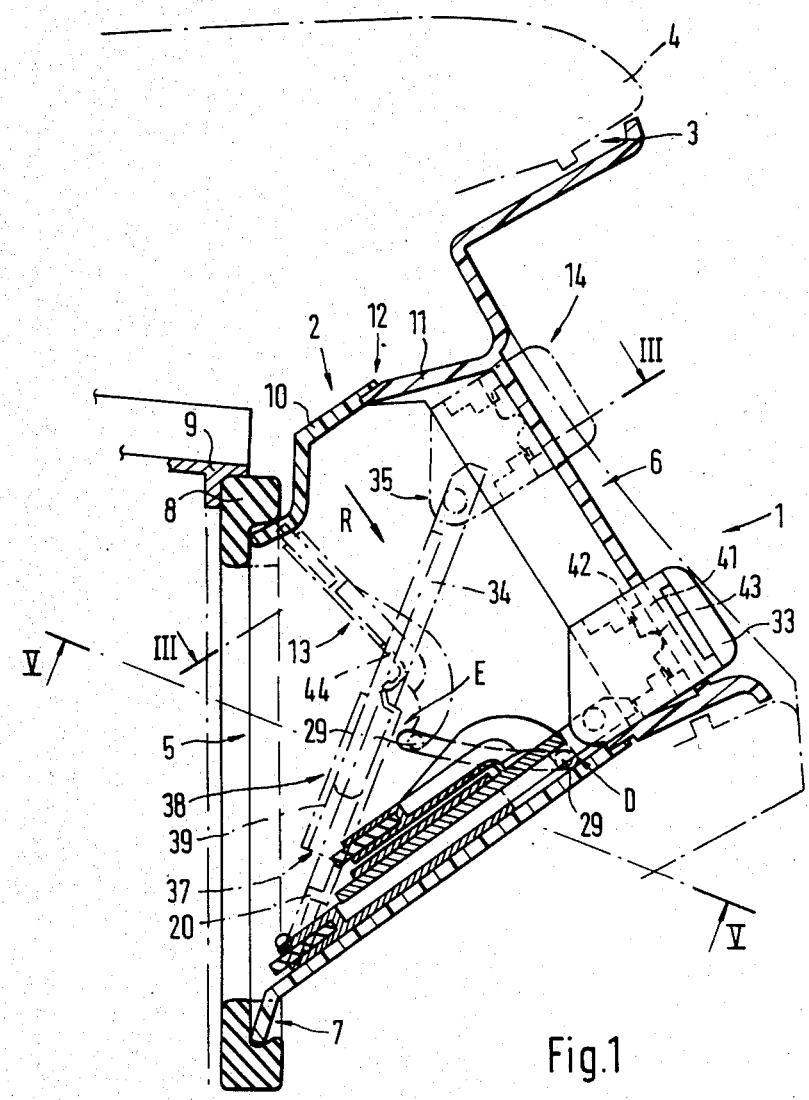
FIG. 1 is a center cross-sectional view through the air discharge installation in accordance with the present invention.

Referring now to the drawing wherein like reference numerals are used throughout the various views to designate like parts, the air discharge installation illustrated in FIG. 1 which is generally designated therein by reference numeral 1 and which serves for the control of the air supply for the interior space of a vehicle, includes a housing generally designated by reference numeral 2 which is inserted into an opening 3 of an instrument panel 4. The housing 2 includes on the one (upstream) side an air inlet opening generally designated by reference numeral 5 which is of rectangular cross section, and on the opposite (downstream) side, an air outlet or discharge opening generally designated by reference numeral 6 which is also of rectangular cross section. An edge 7 of the housing 2, which delimits the air inlet opening 5, is connected with an adjoining heater housing 9 by means of an elastic sealing body 8. For manufacturing reasons, the housing 2 made from synthetic plastic material is assembled of two parts 10 and 11 which are connected with each other at 12 by gluing, welding or the like.

Figure 2:
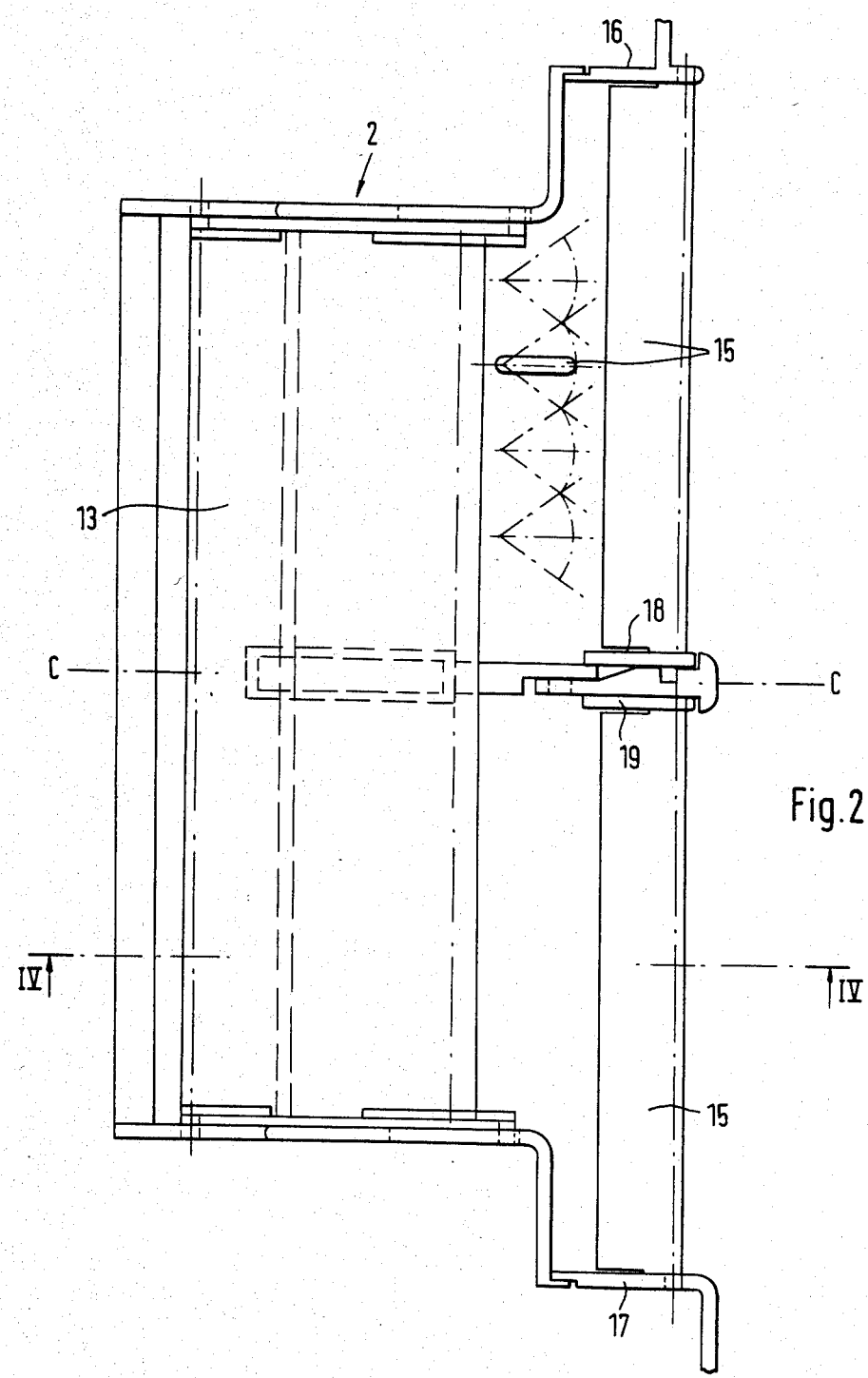
FIG. 2 is an elevational view in the direction of arrow R of FIG. 1.

For the control of the air supply, an air regulating element generally designated by reference numeral 13 is provided inside of the housing 2, and more particularly adjacent the air inlet opening 5, which is adjustable by way of an actuating device generally designated by reference numeral 14. Additionally, at least one pivotal nozzle member 15 is arranged inside of the housing 2, and more particularly within the area of the air outlet opening 6, by means of which the direction of the outflowing air stream is adjustable (FIG. 2). In the illustrated embodiment, two nozzle bodies 15 disposed adjacent one another are provided which are rotatably supported, on the one hand, at laterally outwardly disposed walls 16 and 17 and, on the other, at vertical webs 18 and 19 of the housing 2 which are arranged adjacent a longitudinal center plane C—C. The nozzle bodies 15 are of conventional construction and may be of the type as described in greater detail, for example, in the German Auslegeschrift No. 27 01 816 or in the German Auslegeschrift No. 16 55 956.

The air-regulating element 13 includes at least two flap or valve sections 20 and 21 pivotally connected with each other, which are movable from a folded-together open position A in which the two sections 20 and 21 are disposed one above the other, into an unfolded closing position B by way of intermediate positions (FIG. 4). The first valve section 20 is rotatably supported at the housing 2 with its end 22 remote from the actuating device 14 by way of pins 23. The oppositely disposed free end 24 of the first valve section 20 is connected with the second valve section 21 by way of a pivot bearing 25. The pivot bearing 25 is preferably constructed as film-joint hinge 26. However, the possibility also exists to utilize a conventional hinge in lieu of the film-joint hinge 26.

The two valve sections 20 and 21 and the film-joint hinge 26 are connected with each other in one piece. Both valve sections 20 and 21 are constructed approximately L-shaped in cross section, whereby the film-joint hinge 26 is provided between the free ends of the two shorter legs 27 of each valve section. Additionally, a lever 28 with a pin 29 is arranged at the second valve section 21. The pin 29 extends at a distance to the pivot bearing 25 and cooperates with a guide track 30 at the housing. The guide track 30 and the lever 28 provided with the pin 29 may be arranged either at one or at both outer sides of the air discharge installation 1. The guide track 30 is constructed in the shape of a circular arc or of a predetermined curve and rises from a forward, lower end D to a rear, upper end E (FIG. 1). In the open position A of the air-regulating element 13, the pin 29 of the second valve section 21 is disposed nearly at the end D of the guide track 30 whereas in the closing position B the pin 29 is disposed nearly at the end E. The guide track 30 which is formed by a slot-shaped aperture or recess in the laterally outwardly disposed walls 16 and 17 of the housing 2, extends convexly between its ends D and E. The pivot bearing 25 and the guide track 30 at the housing which cooperates with the pin 29, are so arranged that the free end 31 of the second valve section 21 describes during its adjustment movement a flat curved path 32 extending completely inside of the housing 2 (FIG. 4). The curved path 32 is arranged at a distance to the elastic sealing body 8 as viewed in the longitudinal direction of the duct or channel so that the air-regulating element 13 does not come into contact with the sealing body 8.

The actuating device 14 is composed of a slidable handle-like or knob-like adjusting member 33 adjustable in its height and arranged at the front side of the housing 2 and of a linkage 34. The linkage 34 is rotatably connected at its one end 35 with the slidable adjusting member 33 (FIG. 3). For that purpose, a pivot pin 36 is arranged at the linkage 34 which engages into a corresponding opening 37 of the slidable knob-like adjusting member 33. The oppositely disposed free end 38 of the linkage 34 is displaceably guided in a female mounting element 39 of the first valve section 20, whereby the linkage 34 and the mounting element 39 cooperate slidably in a self-locking manner, e.g., telescopically (FIG. 1). The female mounting element 39 is preferably arranged at the top side 40 of the first valve section 20 and is formed therewith in one piece (FIG. 5). However, the possibility also exists to manufacture the mounting element 39 as a separate part and to connect the same with the first valve section 20 by gluing, welding or the like.

The linkage 34 has an outer shape corresponding to the female mounting element 39. According to FIG. 5, the linkage made of synthetic plastic material is constructed U-shaped for strength and rigidity reasons whereas the female mounting element 39, also made from synthetic plastic material, has a rectangularly shaped cross section. However, the female mounting element 39 and the linkage 34 may also have any other cross-sectional shape.

According to FIG. 2, the female mounting element 39, the linkage 34, and the slidable knob-like adjusting member 33 are arranged in a longitudinal center plane C—C of the air discharge installation 1. However, these structural parts can also be arranged in a laterally outwardly disposed area of the air discharge installation 1.

The slidable adjusting member 33 projects sectionwise into the gap formed by the webs 18 and 29 (FIG. 3) and is guided therein. For that purpose, a formed-on part 41 is provided at the web 18 which cooperates with at least one groove-shaped section 42 of the slidable adjusting member 33. Additionally, a spring element 43 (FIG. 1) is arranged at the slidable adjusting member 33 (FIG. 7), which is supported under prestress at the formed-on part 41.

To enable extension of the linkage 34 through the various parts, on the one hand, the short leg 27 of the first valve section 20 and the film joint hinge 26 are apertured and, on the other hand, an opening 44 is provided locally at the second valve section 21. The size of the opening 44 is so selected that in the closing position B of the air-regulating element 13, the linkage 34 nearly completely closes the opening 44.

For sealing the air inlet opening 5, the air-regulating element 13 is provided in the circumferential area thereof with a seal 45 (FIG. 5) which is inserted into the edge section 46 of the two valve sections 20 and 21 which is U-shaped in cross section.

The adjustment of the air-regulating element takes place in the following manner: In the open position A of the air-regulating element 13, the two flap or valve sections 20 and 21 are folded together within the lower area of the housing 2 disposed approximately parallelly one above the other. The slidable adjusting member 33 is now in its lowermost position. The linkage 34 extends approximately parallelly to the two long legs of the two valve sections 20 and 21.

If the air inlet opening 5 is now to be closed, then the slidable adjusting member 33 is displaced into its upper end position illustrated in dash and dotted lines (FIGS. 1 and 4). As a result of this movement, the first valve section 20 is pivoted upwardly from a position extending approximately parallelly to the lower housing wall. In this position, the first valve section 20 extends at an acute angle to the lower housing wall. At the same time, the second valve section describes an oppositely directed movement (positive control) relative to the first valve section 20 by means of the film-hinge 26 and the pin 29 cooperating with the guide track 30, and more particularly, for such length of time until the pin 29 has reached the upper end E of the guide track 30. In this position of the pin 29, the free end 31 of the second valve section 21 abuts under prestress against the upper wall of the housing 2 and closes the air inlet opening 5.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An air discharge installation for controlling air supplied into an interior space of a vehicle, comprising an air-regulating element connected with an actuating means arranged in a housing means within the area of an air inlet opening, the air-regulating element including a plurality of valve sections pivotally connected with each other, said plurality of valve sections being operable to be moved from a folded-together open position in which the plurality of valve sections are disposed substantially one above the other, by way of intermediate positions into an unfolded closing position, a first valve section of said plurality of valve sections being rotatably supported at one end at the housing means and a second valve section of said plurality of valve sections being connected with a free end of the first valve section by way of a pivot bearing means, the second valve section including a lever means having a pin which extends at a distance to the pivot bearing means and cooperates with a fixed guide track means, and the actuating means operatively engaging the first valve section.

2. An air discharge installation according to claim 1, wherein the plurality of valve sections are connected with each other by way of a film-joint hinge means.

3. An air discharge installation according to claim 2, wherein the plurality of valve sections and the film-joint hinge means are constructed in one piece.

4. An air discharge installation according to claim 1, wherein the actuating means includes a linkage means and a sliding member adjustable in height and arranged at the front side of the housing means, the sliding member being rotatably connected with the linkage means whose free end is guided telescopic-like in a female mounting means of the first valve section, the linkage means and the mounting means cooperating self-lockingly.

5. An air discharge installation according to claim 4, wherein the mounting means and the first valve section are made in one piece.

6. An air discharge installation according to claim 4, wherein the mounting means is mounted on the first valve section and is secured thereon by gluing, welding or the like.

7. An air discharge installation according to claim 4, wherein the mounting means is rectangular in cross section, the linkage means having an outer shape corresponding to the mounting means.

8. An air discharge installation according to claim 7, wherein the mounting means, the linkage means, and the sliding member extend in a longitudinal center plane of the plurality of valve sections, an opening being provided in the air-regulating element for extending the linkage means therethrough.

9. An air discharge installation according to claim 8, wherein the pivot bearing means and the guide track means for the pin are spatially so arranged that the free end of the second valve section describes during its adjusting movement a curved path extending inside of the housing means.

10. An air discharge installation according to claim 9, wherein the two valve sections are connected with each other by way of a film-joint hinge means.

11. An air discharge installation according to claim 10, wherein the two valve sections and the film-joint hinge means are constructed in one piece.

12. An air discharge installation according to claim 9, wherein the mounting means and the first valve section are made in one piece.

13. An air discharge installation according to claim 9, wherein the mounting means is mounted on the first valve section and is secured thereon by gluing, welding or the like.

14. An air discharge installation according to claim 1, wherein the pivot bearing means and the guide track means for the pin are spatially so arranged that the free end of the second valve section describes during its adjusting movement a curved path extending inside of the housing means.

15. An air discharge installation according to claim 14, wherein the mounting means, the linkage means, and the sliding member extend in a longitudinal center plane of the plurality of valve sections, an opening being provided in the air regulating element for extending the linkage means therethrough.

16. An air discharge installation according to claim 14, wherein the actuating means includes a linkage means and a sliding member adjustable in height and arranged at the front side of the housing means, the sliding member being rotatably connected with the linkage means whose free end is guided telescopic-like in a female mounting means of the first valve section, the linkage means and the mounting means cooperating self-lockingly.

17. An air discharge installation according to claim 16, wherein the mounting means and the first valve section are made in one piece.

18. An air discharge installation according to claim 16, wherein the mounting means is mounted on the first valve section and is secured thereon by gluing, welding or the like.

* * * * *